United States Patent
Shen et al.

(10) Patent No.: US 10,242,388 B2
(45) Date of Patent: Mar. 26, 2019

(54) SYSTEMS AND METHODS FOR EFFICIENTLY SELECTING ADVERTISEMENTS FOR SCORING

(71) Applicant: Amobee, Inc., Redwood City, CA (US)

(72) Inventors: Jianqiang Shen, Santa Clara, CA (US); Fang Bian, San Jose, CA (US); Tai-Ping Yu, San Jose, CA (US)

(73) Assignee: Amobee, Inc., Redwood City, CA (US)

( * ) Notice: Subject to any disclaimer, the term of this patent is extended or adjusted under 35 U.S.C. 154(b) by 578 days.

(21) Appl. No.: 14/987,943

(22) Filed: Jan. 5, 2016

(65) Prior Publication Data

US 2017/0193561 A1    Jul. 6, 2017

(51) Int. Cl.
*G06Q 30/00* (2012.01)
*G06Q 30/02* (2012.01)

(52) U.S. Cl.
CPC ..... *G06Q 30/0275* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 5,978,788 A * | 11/1999 | Castelli | G06F 17/30489 |
| 8,768,766 B2 * | 7/2014 | Ellis | G06Q 30/0242 |
| | | | 705/14.43 |
| 8,799,081 B1 * | 8/2014 | Koran | G06Q 30/0275 |
| | | | 705/14.71 |
| 2002/0052829 A1 * | 5/2002 | Boutilier | G06Q 30/08 |
| | | | 705/37 |
| 2004/0010461 A1 * | 1/2004 | Boutilier | G06F 17/10 |
| | | | 705/37 |
| 2006/0212350 A1 * | 9/2006 | Ellis | G06Q 30/0242 |
| | | | 705/14.41 |
| 2006/0241986 A1 * | 10/2006 | Harper | G06N 3/126 |
| | | | 705/7.26 |
| 2010/0088177 A1 * | 4/2010 | Lu | G06Q 30/02 |
| | | | 705/14.43 |
| 2011/0123173 A1 * | 5/2011 | Ruffini | G06Q 30/02 |
| | | | 386/249 |
| 2012/0150656 A1 * | 6/2012 | Karidi | G06Q 30/02 |
| | | | 705/14.66 |
| 2013/0297276 A1 * | 11/2013 | Imai | G01N 27/624 |
| | | | 703/12 |
| 2014/0236705 A1 * | 8/2014 | Shao | G06Q 30/0242 |
| | | | 705/14.41 |

(Continued)

*Primary Examiner* — Matthew T Sittner
(74) *Attorney, Agent, or Firm* — Kwan & Olynick LLP

(57) ABSTRACT

A system and method of selecting on-line advertisements in a real-time bidding exchange is disclosed. A bid request associated with a first data set is received. Advertisements are filtered based on each advertisement's campaign constraints as applied to the first data set. A heuristic score for each filtered advertisement is determined based on a small subset of features from the first data set or randomly generated. A bid value is then determined based on a substantial number of the features from the first data set only for each of a top fraction of filtered the advertisements that have the highest heuristic scores. A final bid value and its associated advertisement is selected and sent to a sender of the bid request for presenting in an on-line advertisement space as an impression.

18 Claims, 7 Drawing Sheets

(56) References Cited

U.S. PATENT DOCUMENTS

| | | | |
|---|---|---|---|
| 2014/0304086 A1* | 10/2014 | Dasdan | G06Q 30/0275 705/14.71 |
| 2015/0073909 A1* | 3/2015 | Peden | G06Q 30/0276 705/14.58 |
| 2015/0199724 A1* | 7/2015 | Negruseri | G06Q 30/0264 705/14.61 |
| 2015/0332317 A1* | 11/2015 | Cui | G06Q 30/0247 705/14.46 |
| 2015/0363835 A1* | 12/2015 | Khan | G06Q 30/0275 705/14.71 |
| 2015/0379563 A1* | 12/2015 | Franosch | G06Q 30/0247 705/14.46 |
| 2016/0260051 A1* | 9/2016 | Wu | G06Q 10/087 |
| 2017/0193561 A1* | 7/2017 | Shen | G06Q 30/0275 |
| 2018/0075493 A1* | 3/2018 | Agarwal | G06Q 30/0275 |

* cited by examiner

SYSTEMS AND METHODS FOR EFFICIENTLY SELECTING ADVERTISEMENTS FOR SCORING

TECHNICAL FIELD OF THE INVENTION

The present invention relates to on-line advertising, and more specifically to ad selection in real-time bidding (RTB) exchanges.

BACKGROUND

In online advertising, internet users are presented with advertisements as they browse the internet using a web browser. Online advertising is an efficient way for advertisers to convey advertising information to potential purchasers of goods and services. It is also an efficient tool for non-profit/political organizations to increase the awareness in a target group of people. The presentation of an advertisement to a single internet user is referred to as an ad impression.

Billions of display ad impressions are purchased on a daily basis through public auctions hosted by real time bidding (RTB) exchanges. In many instances, a decision by an advertiser regarding whether to submit a bid for a selected RTB ad request is made in milliseconds. Advertisers often try to buy a set of ad impressions to reach as many targeted users as possible given one or more budget restrictions. Advertisers may seek an advertiser-specific action from advertisement viewers. For instance, an advertiser may seek to have an advertisement viewer purchase a product, fill out a form, sign up for e-mails, and/or perform some other type of action. An action desired by the advertiser may also be referred to as a conversion. Advertisers typically wish to buy impressions that are more likely to result in one of these desired user actions.

There is a continuing need for improved techniques and systems for facilitating efficient selection of advertisements.

SUMMARY OF THE INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a method of selecting on-line advertisements in a real-time bidding exchange is disclosed. A bid request associated with a first data set is received. Advertisements are filtered based on each advertisement's campaign constraints as applied to the first data set. A heuristic score for each filtered advertisement is determined based on a small subset of features from the first data set or randomly generated. A bid value is then determined based on a substantial number of the features from the first data set only for each of a top fraction of the filtered advertisements that have the highest heuristic scores. A final bid value and its associated advertisement is selected and sent to a sender of the bid request for presenting in an on-line advertisement space as an impression.

In a specific implementation, the determined heuristic scores are decreased for a predefined number or percentage of the advertisements, and the determined heuristic scores are increased for a predefined number or percentage of the advertisements. In one aspect, it is determined whether there are more than a predefined number of advertisements, and the heuristic scores for the filtered advertisements are only determined if there are more than the predefined number. In another aspect, each heuristic score is determined by generating a random number. In yet another aspect, each heuristic score is determined by a stochastic process based on the small subset of features. In a further aspect, each heuristic score is determined by generating a random number using a probability distribution of bid price, click-through rate, action rate, or return-on-investment values, and the probability distribution is constructed from historical records queried from a database system and pertaining to a plurality of impressions for real-time bidding. In a further embodiment, each heuristic score is determined by generating a random number by rejection sampling of the probability distribution.

In another embodiment, the method includes (i) receiving a plurality of bid requests, (ii) for each bid request, repeating the operations of filtering, determining heuristic score, determining a bid value, and determining and sending a final bid value, and (iii) monitoring the time duration for determining the heuristic scores for each bid request and adjusting a number of the small subset of features based on the monitored time duration. In another example, the small subset of features are selected as best discriminating between bid price, click-through rate, action rate, or return-on-investment values that are obtained for such small subset of features from the historical records. In a further aspect, the small subset of features includes an inventory source of the bid request, a top level domain of the bid request, and a channel of the bid request. In another embodiment the method includes (i) constructing and using a probability distribution of bid price, click-through rate, action rate, or return-on-investment values for each filtered advertisement on the top level domain of the bid request if there are enough impression data sets to form a statistically significant probability distribution, (ii) otherwise constructing and using a probability distribution of bid price, click-through rate, action rate, or return-on-investment values for each filtered advertisement on the inventory source of the bid request if there are enough impression data sets to form a statistically significant probability distribution, or (iii) otherwise constructing and using a probability distribution of bid price, click-through rate, action rate, or return-on-investment values on the channel of the bid request if there are enough impression data sets to form a statistically significant probability distribution.

In an alternative embodiment, the invention pertains to a system that includes an advertiser server that is configured to receive a plurality of bid requests and a database system for storing a plurality of historical records pertaining to a plurality of impressions for real-time bidding. The system further includes a bid processing engine that is configured to perform the following: (i) filtering a plurality of advertisements based on each advertisement's campaign constraints as applied to the first data set associated with a bid request received by the advertiser server, (ii) determining a heuristic score for each filtered advertisement based on analysis of a small subset of features from the first data set with respect to the historical records or randomly generated, (iii) only for each of a top fraction of the filtered advertisements that have the highest heuristic scores, determining a bid value based on a substantial number of the features from the first data set, (iv) determining a final one of the bid values. The advertiser server is further configured to send the final bid and its associated advertisement to a sender of the bid request for presenting in an on-line advertisement space as an impression. In further embodiments, the bid processing engine is configured for performing any one or more of the above described operations.

These and other features of the present invention will be presented in more detail in the following specification of certain embodiments of the invention and the accompanying figures which illustrate by way of example the principles of the invention.

DETAILED DESCRIPTION OF SPECIFIC EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory.

In some implementations, techniques and mechanisms may be described herein as solving "optimization" problems or as "optimizing" one or more parameters. It should be noted that the term optimize does not imply that the solution determined or parameter selected is necessarily the best according to any particular metric. For instance, some optimization problems are computationally intense, and computing the best solution may be impractical. Accordingly, optimization may involve the selection of a suitable parameter value or a suitably accurate solution. In some instances, the suitability of a parameter value or solution may be strategically determined based on various factors such as one or more computing capabilities, problem characteristics, and/or time constraints as further described below.

Figure 1:
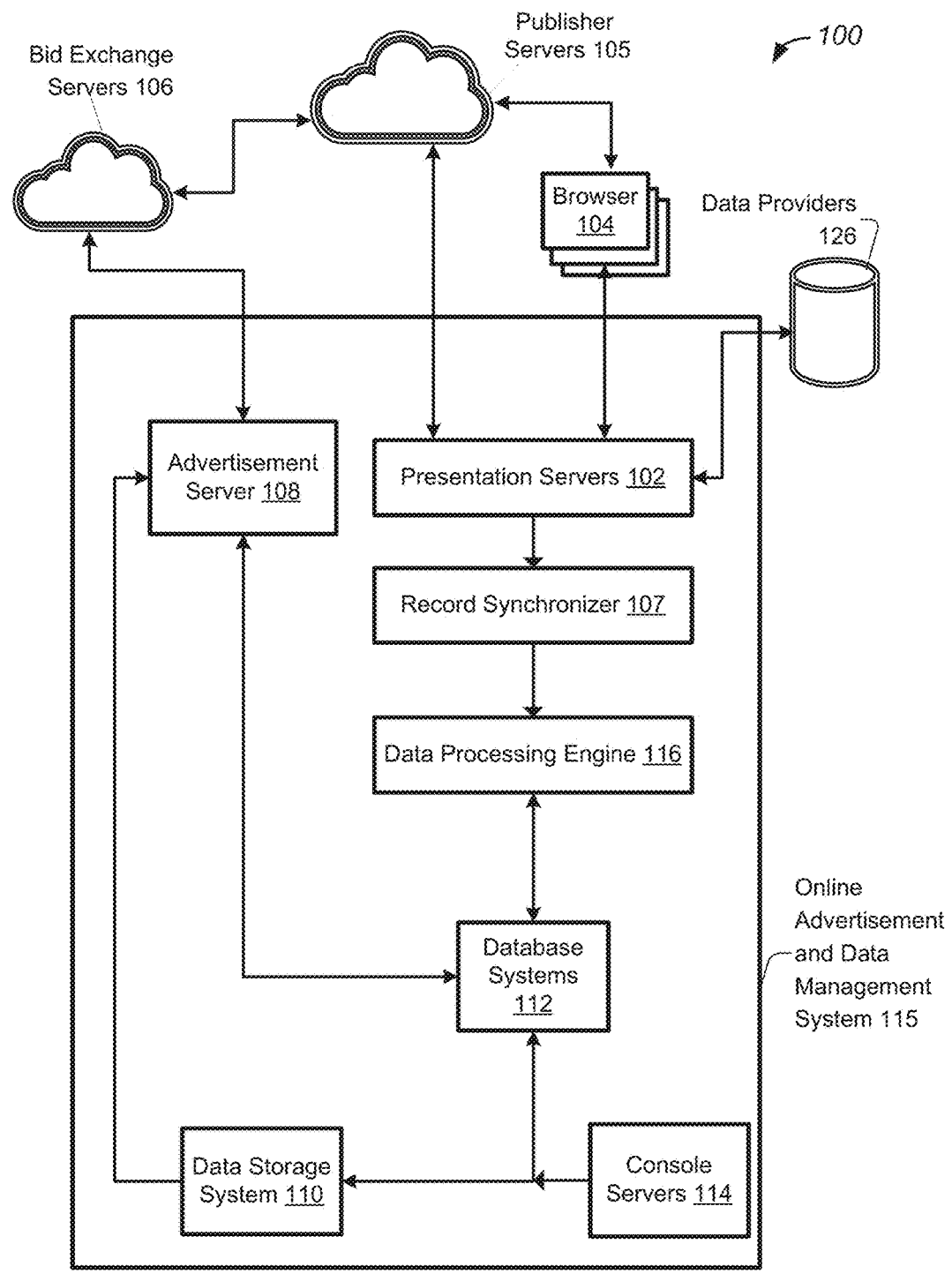
FIG. 1 illustrates a diagram of an example advertisement system configured in accordance with some embodiments.

Example On-Line Advertisement Systems:

Certain embodiments of the present invention provide techniques and systems for selecting advertisements in a bid exchange context. Prior to describing embodiments of an advertisement selection system, one example advertisement system will now be described so as to provide a context for application of such ad selection embodiments. FIG. 1 illustrates a diagram of an example advertisement system 100 configured in accordance with some embodiments. System 100 may include online advertisement and data management system 115, which may be used by an online advertisement service provider to provide advertisement services to one or more entities, such as advertisers.

The online advertisement and data management system 115 may work with any number of external servers, such as publisher servers 105 that provide any suitable type of displayable, executable, audible, or visual media content to users/audience via a user's physical device or on the publisher's device or system. For example, media content may include videos, music, text, games, etc. The content may also pertain to various categories, such as news, entertainment, educational, finance, sports, travel, etc. In a specific implementation, publishers provide media content, such as web pages, from server devices to client devices that are accessible by audience members/users. Example client devices include tablet computing devices, laptop computing devices, personal digital assistant (PDA) devices, mobile phones (e.g., smart phones), desktop computers, televisions, wearable computers, household devices, etc. Each client device may be configured with any suitable hardware and/or software (e.g., browsers and browser add-ins/plug-ins, operating systems for downloading and execution of apps on mobile devices, etc.) that operate in cooperation with the publisher devices/systems for receiving and presenting media content.

Prior to providing requested media content to users, the publishers 105 may also sell ad spaces with respect to such media content. Advertisers at the demand side have ads to place with publisher-provided media content. For instance, an advertiser pays to have an ad placed in an ad space of a particular web page that is sold by a publisher. An ad space may be available on web pages and other types of media, such as mobile device apps, games, coupons, videos, etc.

The publisher servers 105 may be configured to generate bid requests, which are forwarded to advertisement servers 108. In response to the bid requests, advertisement servers 108 generate one or more bid responses based on various advertisement campaign criteria. Additionally, one or more of the advertisement servers 108 may form part of online advertisement and data management system 115 or may be external to such system 115. Such bid responses may be transmitted and handled in cooperation with a bid exchange server 106 that together select an optimum bid for transmitting to the sender of the bid request, e.g., one of publisher servers 105 to be presented, along with the media content, to the user.

The bid exchange server 106 generally runs an auction to determine a price of a match between an ad and a web page. In essence, bid exchanges are the markets providing mechanisms for facilitating bidding processes between the demand and supply sides. The ad exchanges may be implemented on any suitable number and type of computing devices.

Advertisement servers 108 may also be configured to store budget data associated with one or more advertisement campaigns, and may be further configured to implement the one or more advertisement campaigns over a designated period of time. In some embodiments, the implementation of the advertisement campaign may include identifying actions or communications channels associated with users targeted by advertisement campaigns, placing bids for impression opportunities, and serving content upon winning a bid. In some embodiments, the content may be advertisement content, such as an Internet advertisement banner, which may be associated with a particular advertisement campaign. The terms "advertisement server" and "advertiser" are used herein generally to describe systems that may include a diverse and complex arrangement of systems and servers that work together to display an advertisement to a user's device. For instance, this system will generally include a plurality of servers and processing nodes for performing different tasks, such as bid management (e.g., advertisement servers 108), bid exchange (e.g., bid exchange servers 106), advertisement and campaign creation, content publication (e.g., publisher servers 105), etc.

Demand side platforms (DSP), such as advertisement server 108, may be generally configured to manage advertising campaigns on behalf of advertisers although some advertisers may also work directly with bid exchange servers. Given a user requesting a particular web page, a DSP is able to find the best ad for the user. The best ad may be selected from the ads managed by the DSP. For each ad selected, various constraints (mostly selected by the advertisers, but some by the ad exchange, the publisher, and the DSP) are met.

Online advertisement and data management system 115 may further include various components, such as one or more presentation servers 102, for managing online data for facilitation of online advertising. According to some embodiments, presentation servers 102 may be configured to aggregate various online advertising data from several data sources, such as data providers 126. The online data may be obtained or accessible as $1^{st}$ and $3^{rd}$ party data from various data suppliers, such as first parties (the advertisers themselves) or third parties (independent data suppliers).

The online advertising data may include live Internet data traffic that may be associated with users, as well as variety of supporting tasks. For example, the online advertising data may include one or more data values identifying various impressions, clicks, data collection events, and/or beacon fires that may characterize interactions between users and one or more advertisement campaigns. Such data may also be described as performance data that may form the underlying basis of analyzing a performance of one or more advertisement campaigns. In some embodiments, presentation servers 102 may be front-end servers that may be configured to process a large number of Internet users and associated SSL (Secure Socket Layer) handling. The front-end servers may be configured to generate and receive messages to communicate with other servers in system 100. In some embodiments, the front-end servers 102 may be configured to perform logging of events that are periodically collected and sent to additional components of system 100 for further processing.

Presentation servers 102 may be communicatively coupled to one or more data sources such as data providers 126, browsers 104, and publisher servers 105. In some embodiments, each browser 104 may be an Internet browser that may be running on a client machine associated with a user. Thus, a user may use a browser to access the Internet and receive advertisement content from one or more publisher servers 105. Accordingly, various clicks and other actions may be performed by users via browsers 104. Moreover, browsers 104 may be configured to generate various online advertising data described above. For example, various cookies, advertisement identifiers, beacon fires, and anonymous user identifiers may be identified by browser 104 based on one or more user actions, and may be transmitted to presentation servers 102 (as well as through publisher servers 105) for further processing.

Various additional data sources may also be communicatively coupled with presentation servers 102 and may also be configured to transmit identifiers and online advertising data based on the implementation of one or more advertisement campaigns by various advertisement servers, such as advertisement servers 108. For example, these additional advertisement servers may include bid processing services, which may process bid requests and generate one or more data events associated with providing online advertisement content based on the bid requests. Thus, bid processing services of advertisement servers 108 may be configured to generate data events characterizing the processing of bid requests and implementation of advertisement campaigns. Such bid request data may be transmitted to presentation servers 102.

In various embodiments, online advertisement and data management system 115 may further include record synchronizer 107, which may be configured to receive one or more records from various data sources that characterize user actions and data events described above. In some embodiments, the records may be log files that include one or more data values characterizing the substance of a user action or data event, such as specifying a click or conversion. The data values may also characterize metadata associated with a user action or data event, such as specifying a timestamp identifying when the user action or data event took place. According to various embodiments, record synchronizer 107 may be further configured to transfer the received records, which may be log files, from various end points, such as presentation servers 102, browsers 104, publisher servers 105, and advertisement servers 108 described above, to a data storage system, such as data storage system 110 or database system 112 described in greater detail below. Accordingly, record synchronizer 107 may be configured to handle the transfer of log files from various end points located at different locations throughout the world to data storage system 110 as well as other components of system 100, such as data processing engine 116 discussed in greater detail below. In some embodiments, record synchronizer 107 may be configured and implemented as a MapReduce system that is configured to implement a MapReduce job to directly communicate with a communications port of each respective endpoint and periodically download new log files.

In various embodiments, online advertisement system 115 may include data processing engine 116 which may be configured to perform any suitable data management, processing, or analyzing tasks on any type and size of data. For instance, data processing engine 116 may include modules for transforming and efficiently storing data received via log synchronizer 107. The data processing engine 116 may also be configured to analyze data for various advertisement purposes, such as advertisement selection, campaign performance, audience targeting, reporting, etc. For instance, the data processing engine 116 may be configured to efficiently select advertisements as further described below.

In various embodiments, online advertisement system 115 may also include database system 112 which may be configured to store data generated or accessed by data processing engine 116. Ingestion jobs may be scheduled at regular intervals (every few hours or daily) to generate different versions of the cache tables. These caches may be asynchronously loaded into a highly scalable distributed data store. In some embodiments, database system 112 may be implemented as one or more clusters having one or more nodes. For example, database system 112 may be implemented as a four-node RAC (Real Application Cluster). Two nodes may be configured to process system metadata, and two nodes may be configured to process various online advertisement data, which may be performance data, that may be utilized by data processing engine 116. In various embodiments, database system 112 may be implemented as a scalable database system which may be scaled up to accommodate the large quantities of online advertising data handled by system 100 as further described herein. Additional instances may be generated and added to database system 112 by making configuration changes. Several embodiments for redundant data warehousing, configured in accordance with one or more embodiments, are further described in U.S. patent application Ser. No. 14/535,577, filed Nov. 7, 2014, which is incorporated herein by reference in its entirety for all purposes.

In various embodiments, such large data processing contexts may involve performance and user data stored across multiple servers and storage devices or systems implementing one or more redundancy mechanisms configured to provide fault tolerance for performance and user data. In one example context, a reporting pipeline ingests log records attributing to user events such as impressions, clicks and actions. The pipeline can generate more than 20,000 caches. In one embodiment, these caches are consumed and presented by front-end applications. The pipeline pre-computes these amounting to several terabytes of data every day. In certain embodiments, the ETL (extract, transform, load) phase of the pipeline does most of the heavy lifting (join and group operations) via map-reduce and pig jobs and stores the pre-computed caches in a data storage system 110, such as a distributed file system. One example of a distributed file system is the Hadoop Distributed File System (HDFS)®, which includes several Hadoop® clusters specifically configured for processing and computation of the received log files.

In various embodiments, database system 112 may be communicatively coupled to console servers 114 which may be configured to execute one or more front-end applications. For example, console servers 114 may be configured to provide application program interface (API) based configuration of advertisements and various other advertisement campaign data objects. Accordingly, an advertiser may interact with and modify one or more advertisement campaign data objects via the console servers. In this way, specific configurations of advertisement campaigns may be received via console servers 114, stored in database system 112, and accessed by advertisement servers 108 which may also be communicatively coupled to database system 112. Moreover, console servers 114 may be configured to receive queries with respect to user or performance data, and may be further configured to generate one or more messages that transmit such queries to other components of system 100.

In various embodiments, the various engines and modules of the advertisement and data management system, such as data processing engine 116 or advertisement servers 108, or any their respective components may include one or more processing devices configured to manage advertising tasks and manage data received from various data sources, such as a data storage system operated and maintained by an online advertisement service provider, such as Turn® Inc. of Redwood City, Calif. in some embodiments, such processing devices may each include one or more communications interfaces configured to communicatively couple to other components and entities, such as coupling data processing engine 116 to a data storage system and a record synchronizer. Furthermore, each data processing component may include one or more processing devices specifically configured to process data associated with data events, online users, and websites. In another example, each module or engine may include multiple data processing nodes for processing large amounts of data, such as performance data, in a distributed manner, in one specific embodiment, each module and engine may include one or more application specific processors implemented in application specific integrated circuits (ASICs) that may be specifically configured to process large amounts of data in complex data sets, as may be found in the context referred to as "big data."

In some embodiments, the one or more processors may be implemented in one or more reprogrammable logic devices, such as a field-programmable gate array (FPGAs), which may also be similarly configured. The one or more processors may each include various input and output buffers for efficiently receiving data and outputting processed data, respectively. According to various embodiments, each system component or engine may be implemented as a controller, which may be a hardware controller. Moreover, each system component or engine may be configured to include one or more dedicated processing units that include one or more hardware accelerators configured to perform pipelined data processing operations. For example, operations associated with selecting advertisements as described herein may be handled, at least in part, by one or more hardware accelerators included in data processing engine 116.

Advertisement Selection Embodiments:

For a typical DSP bidding system, each received request is compared with the requirement of each active advertisement (such as demographic and geographic rules). The DSP system will filter out those unqualified advertisements. This process is usually very efficient and fast. For each of those qualified advertisement, the system will typically calculate a score and bidding price by analyzing this request, advertisement and large amounts of data. This process is usually costly and cannot handle a large number of advertisements in the limited time after which the bid is lost without serving an advertisement.

As programmatic bidding becomes more and more popular, many advertisers are switching to DSP for delivering their advertisements. The additional advertisers and their corresponding ads add more computation cost to the DSP bidding system. That is, more and more advertisements increasingly qualify for a bid request. Thus, the system has to calculate the scores of more and more advertisements so that the system will get timed-out more frequently and consequently affect revenue.

Certain embodiments described herein provide a method and system to heuristically evaluate qualified advertisements before calculating the scoring for such advertisements. Initially, the qualified ads are scored heuristically, and only a top scoring portion of these ads are scored more rigorously to determine a bid price. The system limits the number of advertisements for the final scoring so as to ensure that a response to the bid request is sent in time, e.g., 100 milliseconds or less.

Figure 2:
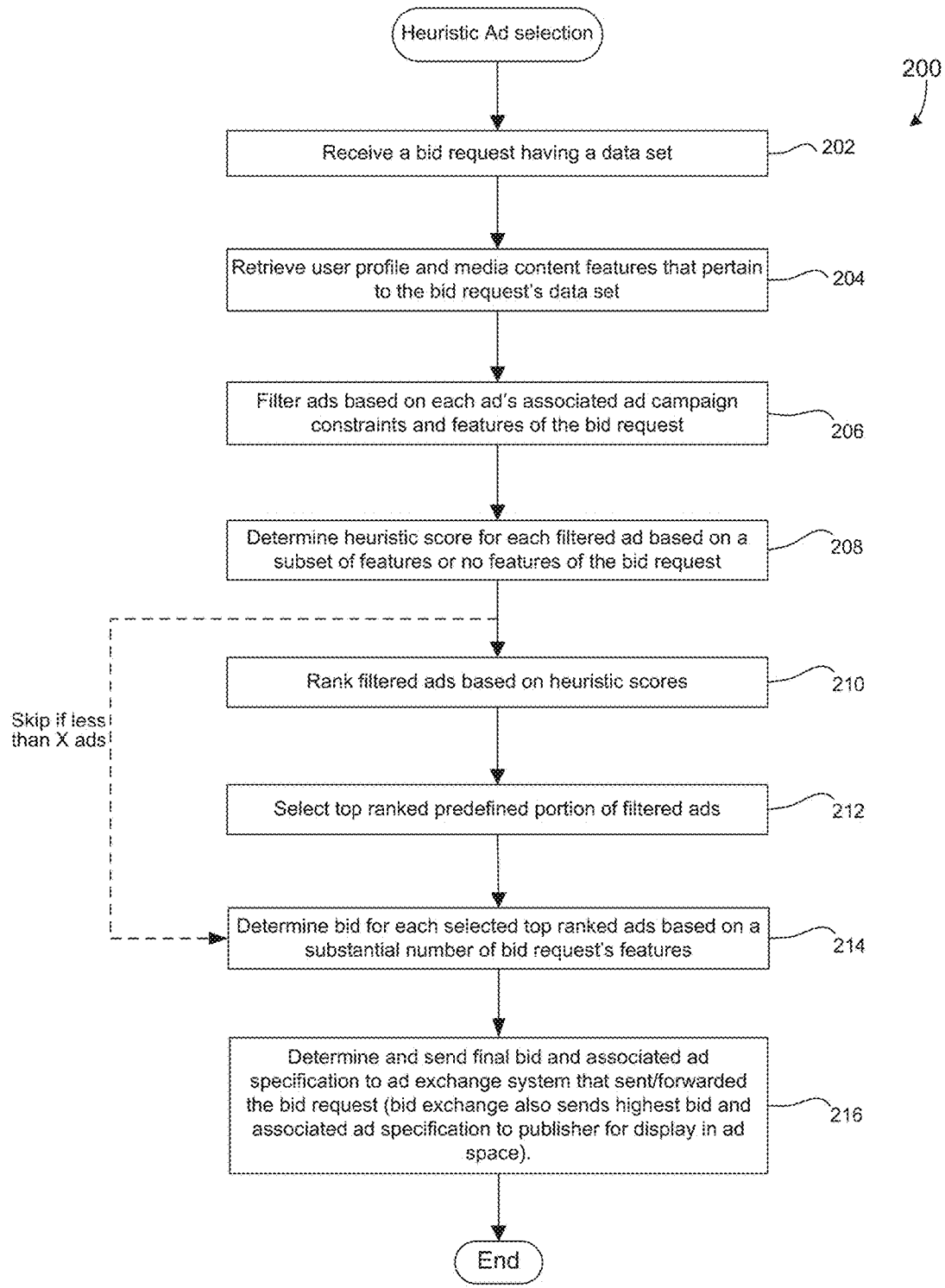
FIG. 2 is a flow chart illustrating a bid determination process with heuristic scoring in accordance with one embodiment of the present invention.

FIG. 2 is a flow chart illustrating a bid determination process 200 with heuristic scoring in accordance with one embodiment of the present invention. According to various embodiments, the method 200 may be performed at a computing system configured to provide advertising campaign management services, often in cooperation with other computing systems. For instance, the system may be configured to establish parameters for different advertising campaigns, to receive advertising opportunity bid requests from a real time bid exchange system via a network, to place bids on at least some of the received bid requests, and to evaluate the performance of the advertising campaigns. For instance, the data processing engine 116 of FIG. 1 may be configured to implement ad selection embodiments.

This bid determination process of FIG. 2 is described with respect to a single bid request received and handled by a single DSP. However, it is understood that real-time bidding involves a large number of bid requests sent by a large number of different publishers to a large number of real-time bid exchange systems and respective DSPs or advertiser management systems.

Initially, a bid request having a data set may be received in operation 202. The data set may include a user ID and media content ID (e.g., u and w). Some user profile and/or media content profile data may also be provided by the publisher with the bid request.

The user profile of user u may include any characteristics that were, are, or can be associated with the particular user u. To protect a user's privacy, user profile data may be stored with an anonymized type of user identifier, such as an arbitrary or randomized identity, rather than the user's actual name, specific residency, or any other type of user identifying information. Examples of user profile data for the particular anonymized user u may include descriptive data, such as personal or professional interests, employment status, home ownership, knowledge of languages, age, education level, gender, race and/or ethnicity, income, marital status, religion, size of family, field of expertise, residential location (country, state, DMA, etc.), travel location, or predictive data, such as likelihood to consume content or perform an activity, such as clicking on an ad, visiting a page or purchasing a product or service, in the near future, etc.

The user profile data may also include browsing history information, such as pages visited, amount of time per page viewing, links clicked on, searches performed, actions or interactions taken, amount and type of purchases made, etc. The browsing history information may be expressed using any suitable one or more metrics, such as count, absolute or relative value, average, mean, frequency, time duration, etc. The user profile of user u may also include contextual data, such as where the user is currently located, the weather at such location, current events at such location, etc. For instance, the ad request may include a GPS (global positioning satellite) value or access point location for the user u, and other contextual data may be scraped from other databases, such as a weather or entertainment event web site for such location.

The media content profile may identify various characteristics of the web page or ad space or ad placement that is available for purchase, such as one or more content category, ad placement position (e.g., top, side, or bottom of page), ad type (e.g., banner, video, pop-up), brand safety (e.g., absence of alcohol, violence, drugs, competitive brands), page quality (e.g., absence of cluttering images, prominent display of the ad), etc.

Some data related to the bid request may be obtainable by the DSP from sources other than the bid request. For instance, the DSP may obtain user demographics data based on a provided user ID or media content ID provided in the bid request. Referring back to the illustrated embodiment, user profile and media content profile features that pertain to the bid request's data set may be retrieved in operation 204. For example, this retrieval process may be performed to obtain user or media content data items or features that were not provided in the bid request if a user II) and/or media content ID (u and w) is provided in the bid request and user and media content profile data is retrievable. For instance, the DSP retrieves user and media content profiles and/or other type of data items) that were previously stored and mapped to the user ID and media content ID (u and w) provided in the bid request. However, either profile may also be empty if u or w is new to DSP or if u or w is not provided in the bid request sent to DSP.

Figure 3:
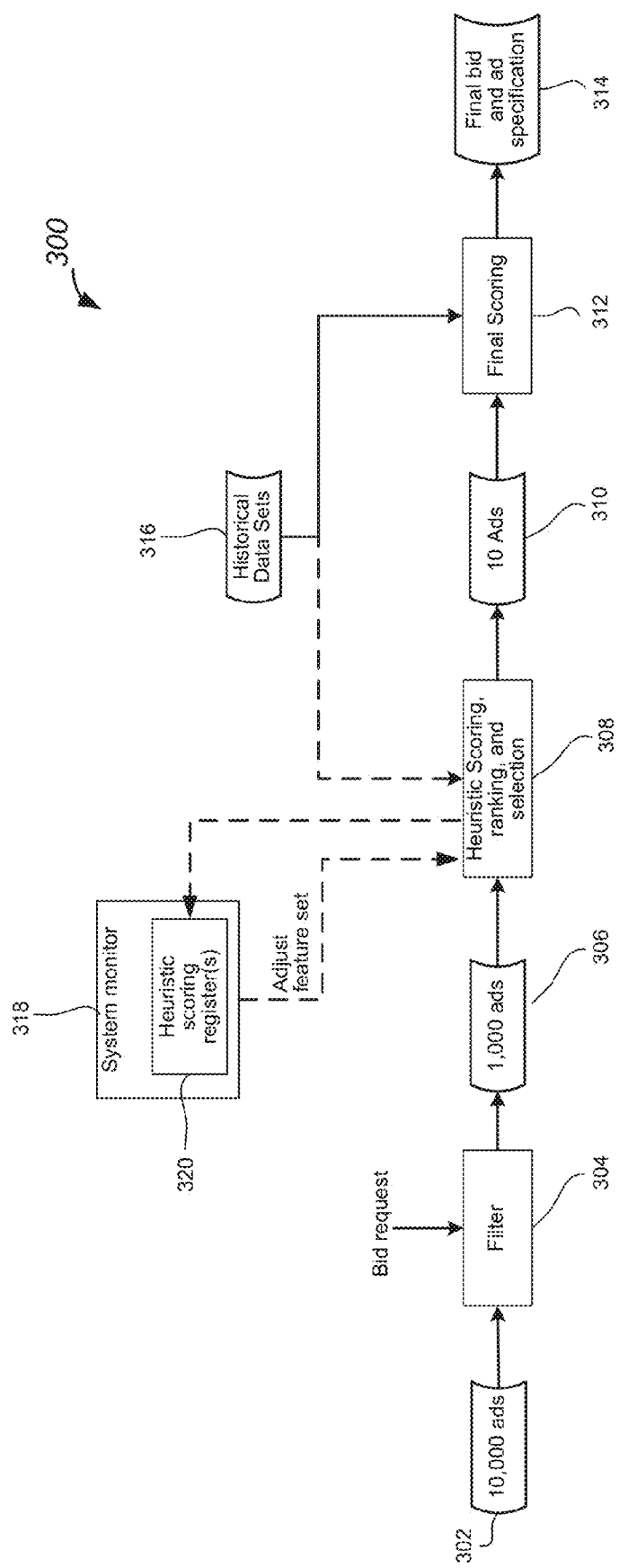
FIG. 3 is a diagrammatic representation of an ad selection system utilizing heuristic scoring in accordance with one embodiment of the present invention.

Certain embodiments of the present invention provide an ad selection process with multiple steps, some of which are applied to only a portion of the advertisements as further described herein. FIG. 3 is a diagrammatic representation of an ad selection system utilizing heuristic scoring in accordance with one embodiment of the present invention. FIG. 3 will be used to illustrate ad selection in conjunction with the operations of FIG. 2.

Overall, the DSP may run various advertisement optimization processes on all or a subset of the ads to find the best ad for u and w of the bid request. From an advertiser's perspective, advertisement optimization may include optimizing for the ads' campaign goals while satisfying constraints. In general, the DSP may work with a variety of advertisers who utilize different campaign types. The campaigns may utilize performance goals for each package or segment of users or media content. That is, different packages may have a different set of constraints and different performance metric goals. A performance metric may include a cost-per-click (CPC), cost-per-action (CPA), click-through-rate (CTR), or action-rate (AR) although CPA is used herein to refer to any type of performance metric or goal. The packages of a particular campaign may have the same ad or a custom ad for the particular segment of users or media content.

Referring back to FIG. 2, the DSP may first filter ads based on each ad's associated ad constraints and features of the bid request in operation 206. For instance, one particular ad constraint specifies that this particular ad only applies to users from California. Accordingly, if the ad request has a user u, who is from Oregon, this particular ad is filtered out from the candidate ads. In contrast, if another ad has an associated constraint specifying users from Oregon, this other ad is not filtered out for the ad request for an Oregon user and such other ad is deemed to be a candidate ad for further bid processing.

As shown in the FIG. 3 example, 10,000 ads (302), along with the bid request, are input to the filter process 304, which outputs 1,000 ads (306). The number of ads that are input to the filtering process may vary quite a bit. One factor depends on the particular source of the incoming bid request. For instance, 10,000 ads may be filtered for a popular ad exchange, while 1,000 ads may be filtered for a less popular ad exchange. In general, the number of ads for filtering is between about 100 to 10,000 although the upper limit is expected to keep increasing. In certain embodiments, the process 200 may skip to heuristic scoring steps for the filtered ads if the number of filtered ads is less than a predefined threshold, such as 50. In general, heuristic scoring may not be needed if the number of ads is small and can be fully scored to generate a bid response in the amount of available time for the current bid opportunity.

After ads are filtered, a heuristic score may be determined for each filtered ad based on a subset of the features or no features of the bid request (as provided in the bid request itself and/or retrieved for such bid request) in operation 208 as further described below. The filtered ads may then be ranked based on the determined heuristic scores in operation 210. A predefined top portion of the ranked ads may then be selected in operation 212. That is, a limited number of ranked ads (e.g., 50) are selected for further scoring in the ad selection process. In the example of FIG. 3, the 1,000 ads (306) that are output from the filtering process 304 are input to heuristic scoring, ranking, and ad selection process 308, which outputs only 10 ads (310).

Given the tight time constraints for responding to a bid request, significantly reducing the number of ads that are to more rigorously processed with a substantial portion of the data features will allow a significant reduction in loss of ad opportunities due to running out of time from processing a higher number of ads. In the illustrated example, only 10 ads will then be scored using a high number of bid request features with respect to a large amount of historical data, as opposed to rigorously scoring 1000 ads based on such a large amount of historical data features.

Any suitable technique may be used to determine a heuristic score for the ads. In general, the technique quickly generates heuristic scores for all the ads, which allows selection of a limited number of ads to which a further optimization process is applied so as to select an ad within the available time frame for responding to the bid request (e.g., less than 100 or even less than 50 milliseconds) without losing the advertising opportunity. In some embodiments, the heuristic score may be calculated based on factors that are correlated to bid price so as to select ads that will more likely result in higher bids. In other embodiments, a heuristic score may be determined so as to give ads that correlated to lower performance (or are new) a chance to be selected by using an exploration technique to more randomly score ads. In general, heuristic scores may be calculated using a performance approach and/or an exploration approach.

For a simple and efficient implementation, a random number between 0 and 1 may be generated for each filtered ad. This random approach assigns heuristic scores to the filtered ads without analyzing any features with respect to historical data sets. Accordingly, this approach allows for new ads to be selected as much as higher performing ads. That is, all the filtered ads have the same chance of getting a higher ranked heuristic score and, as a result, being selected for the final, rigorous scoring.

In certain embodiments, a stochastic process may be used to determine a heuristic score, in the form of a bid price, for each ad that is based on a low number of the features associated with the current bid request and correlated to bid price. Based on a small feature set for each ad and bid request, a heuristic score, e.g., bid price, may be generated based on a probability distribution that is constructed from the historical data sets. Any type of probability distribution may be constructed based on any suitable features. For instance, a continuous probability distribution of bid price for a particular ad may be constructed based on historical data sets (316) for the low number of features and the particular ad's bid price performance. Construction of a normal or Gaussian probability distribution works well and appears to be the most efficient way although other continuous probability distributions (such as gamma, beta, continuous uniform, etc.) may be used.

In the illustrated embodiments, probability distributions are constructed for bidding price. In other embodiment, it is possible that probability distribution can be constructed for other metrics, such as click-through rate, action rate, or return on investment values. The following illustrated approach can be similarly applied to these alternative embodiments.

A system monitor 318 may be configured to monitor the heuristic scoring time durations and adjust the small subset of features for generating probability distributions from which heuristic scores are generated. For instance, the system monitor may track and store timing parameters related to heuristic scoring in one or more heuristic scoring register(s) 320. The heuristic scoring parameters in register(s) 320 may include an average time for calculating the heuristic scores for all the ads over multiple bid requests, as well as standard deviation values, rate of change, mean value, etc. If the heuristic scoring starts to take less time, more features can be added to the small subset of features. For instance, if the heuristic scoring time is reduced by half, then the number of features may be doubled. In contrast, if the heuristic scoring starts to take more time and is approaching a predefined threshold of the average time that is available for providing a bid response, then the number of features in the small subset needs to be reduced. In one embodiment, the number of ads selected for thorough scoring may depend on how much time has been spent so far on the particular bid request. For example, if 60 milliseconds have been spent on filtering a bid request, then only 10 ads may be chosen for thorough scoring. If only 10 milliseconds have been spent on filtering, on the other hand, then 50 ads can be selected for thorough scoring.

Figure 4:
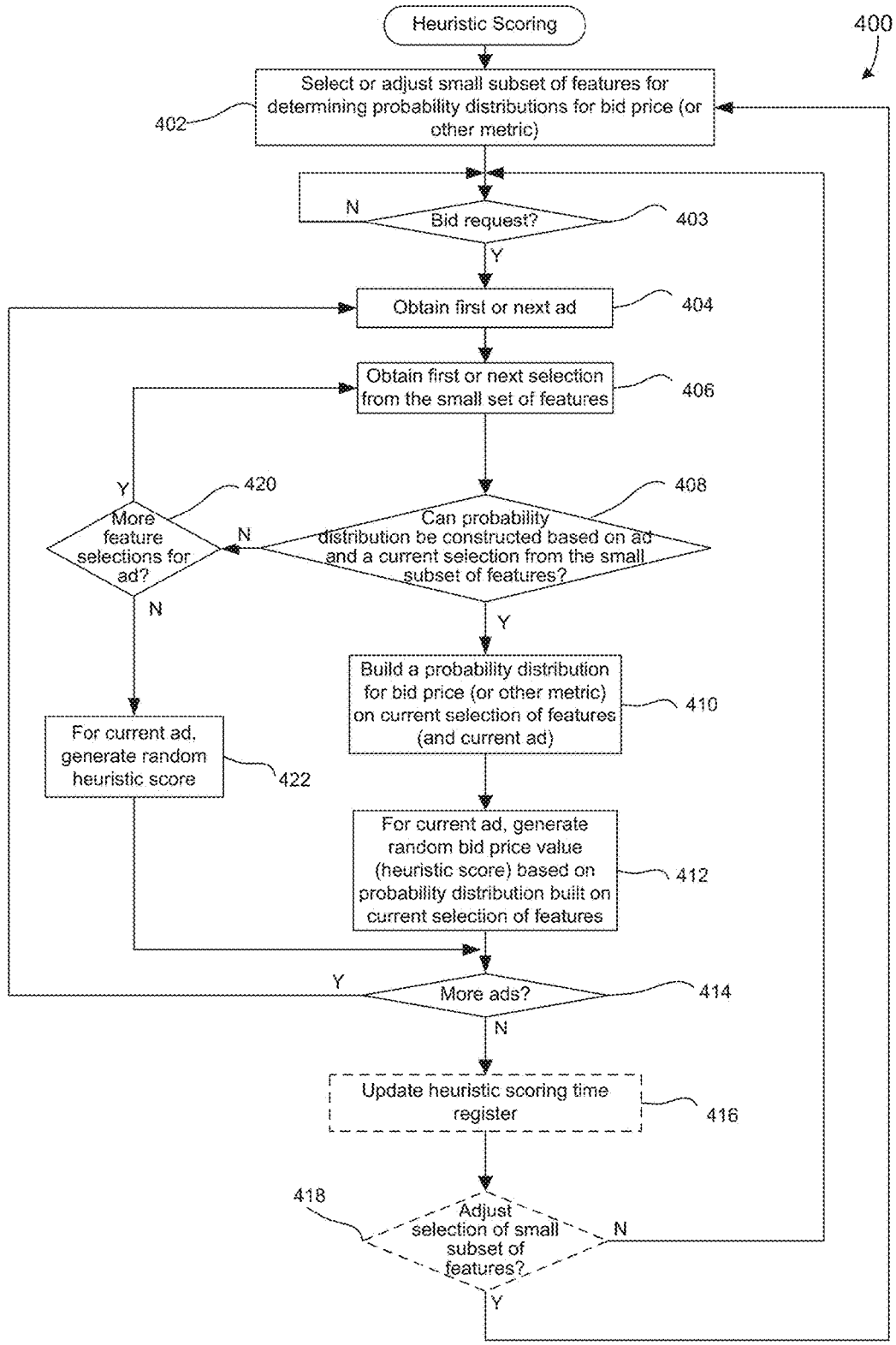
FIG. 4 is a flow chart illustrating a stochastic-based heuristic scoring process in accordance with a specific implementation of the present invention.

In one embodiment, the heuristic score for each filtered ad can be calculated to correspond to how likely the bid request's small set of features will be valuable for the particular ad's placement. FIG. 4 is a flow chart illustrating a stochastic-based heuristic scoring process in accordance with a specific implementation of the present invention. Initially, a first small subset of features is selected for determining probability distributions for bid price (or other metric) in operation 402. In general, the small feature set may be selected based on which features are most discriminatory with respect to the corresponding bid price values that will be used to construct the probability distributions.

Any suitable feature selection or extraction technique may be used. The small set of features that are used to construct the probability distribution for each ad may include any suitable features that tend to best discriminate between particular values (e.g., bid price). The small set of features may be selected based on correlation measurements, such as a Pearson correlation or mutual information gain, between the features and the final value of the probability curves. Example automated feature extraction techniques include Principal Component Analysis (PCA), Independent Component Analysis (ICA), Local Linear Embedding (LLE) algorithm, etc.

An example small set of features that work well for constructing probability distributions includes the top level domain (TLD), channel, and inventory source. The TLD is the highest level portion of the particular URL (universal resource locator) that is being requested to be displayed on a user's client device, examples of which include cnn.com, yahoo.com, etc. The channel can be the type of media that is being shown to the user's client device, examples of which include display, mobile, social, video, etc. The inventory source generally specifies the ad exchange market from which the bid request originates, examples of which include DoubleClick, AppNexus, etc. The inventory source may be integrated with providing ads for different media publishers, such as cnn.com, etc. Additionally, different inventory sources may be integrated with the same TLD. The TLD, channel, and inventory source are generally identified in the bid request. In one example bid request, the TLD is cnn.com; the channel is a display; and the inventory source is DoubleClick. Some of these features may not be identified in the bid request. Other features may be used for constructing a probability distribution and may include device type; OS type, geo location, etc.

The process 400 may then wait for a bid request to be received in operation 403. After a bid request is received, the ads may then all be scored, either sequentially or in parallel (although a sequential process is shown). In the illustrated embodiment, a first ad is obtained in operation 404. A first selection from the small set of features is obtained in operation 406. In the present example, the small subset of features includes TLD, inventory source, and channel, and the first selection out of this subset can include TLD for the current ad. However, a less data intensive set of features may be used instead if CPU resources are limited.

It may then be determined whether a probability distribution can be constructed based on the current ad and the current selection from the small subset of features in operations 408. For instance, it's determined whether there are enough impressions for the current ad and TLD of the bid request in the historical records to construct a probability distribution. For example, 10 impressions for the current ad at the current TLD would not make a statistically strong probability curve. In general, the impressions have to number that allows construction of a statistically significant curve. There are multiple methods to determine if the data is sufficient. One technique includes simply setting up a threshold (e.g., 100). If there are data points that number more than this threshold, it can be determined that there is sufficient data to build the probability distribution. In another technique, a normality test (such as Anderson-Darling test, the Shapiro-Wilk test, and the Lilliefors (Kolmogorov-Smirnov) test) can be run. If a probability curve cannot be constructed with the current feature selection, it may then be determined whether there is another selection from the small subset of feature in operation 420. For instance, a next selection may be obtained from the small subset of features (e.g., inventory source on current ad) in operation 408. If there are enough impressions to construct a probability distribution, the probability distribution may then be built for the bid price on the current selection of features in operation 410.

Any number of probability distributions may be constructed for each ad. By way of example, the following distributions may be obtained for an ad: (i) a probability distribution of the bid price of the current ad on the current TLD, (ii) a probability distribution of the bid price of the current ad on the current inventory source, (iii) a probability distribution of the bid price of the current channel on the current inventory source. Note that the last distribution is not constructed on the current ad. These three probability distributions can be constructed for the current ad, depending if there are enough impressions for forming statistically significant distributions. Of course, the last distribution with respect to the current channel for the current inventory source may be formed once for all ads.

Figure 5A:
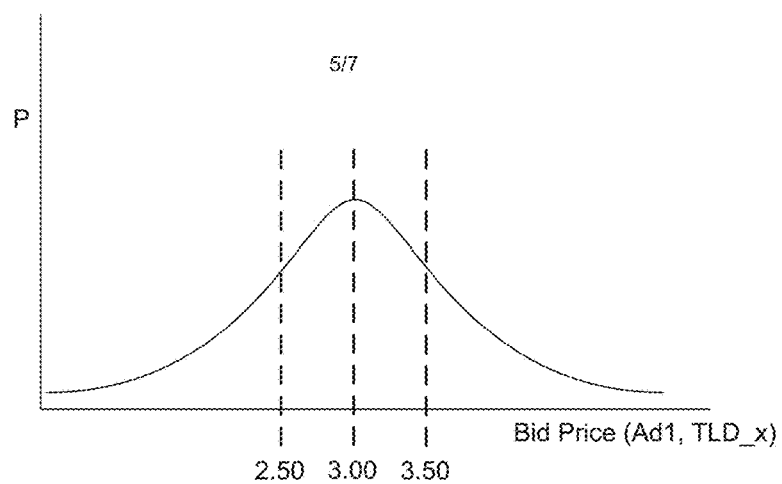
FIG. 5A is a Gaussian probability distribution of the bid price for a first ad "Ad1" on a specific TLD "TLD_x" in accordance with one example implementation of the present invention.

Any suitable type of probability distribution can be constructed for each ad. In a Gaussian distribution example, the historical records may be analyzed to determine the distribution of bid price values for each combination of features. For instance, the average bid price and its standard deviation for each combination of features can be used to construct a normal curve. FIG. 5A is a Gaussian probability distribution of the bid price for a first ad "Ad1" on a specific TLD "TLD_x" in accordance with one example implementation of the present invention. As shown, the bid price average for ad1 on TLD_x is $3.00 and the standard deviation is $0.50. In some embodiments, each distribution can be constructed on the fly for each bid request by querying the historical record database for the bid price values for particular feature combinations to determine a mean and standard deviation, which are then used to form a Gaussian probability distribution. In other embodiments, the average and standard deviation for each feature subset can be stored and updated as bids are made with respect to such feature subset. In certain embodiments, probability distributions for various feature subsets (e.g., different TLD's, different ad exchanges, and different channels) can be constructed independently of received bid requests and stored for use in generating a heuristic score when bids that are associated with a specific feature set are received.

Figure 5B:
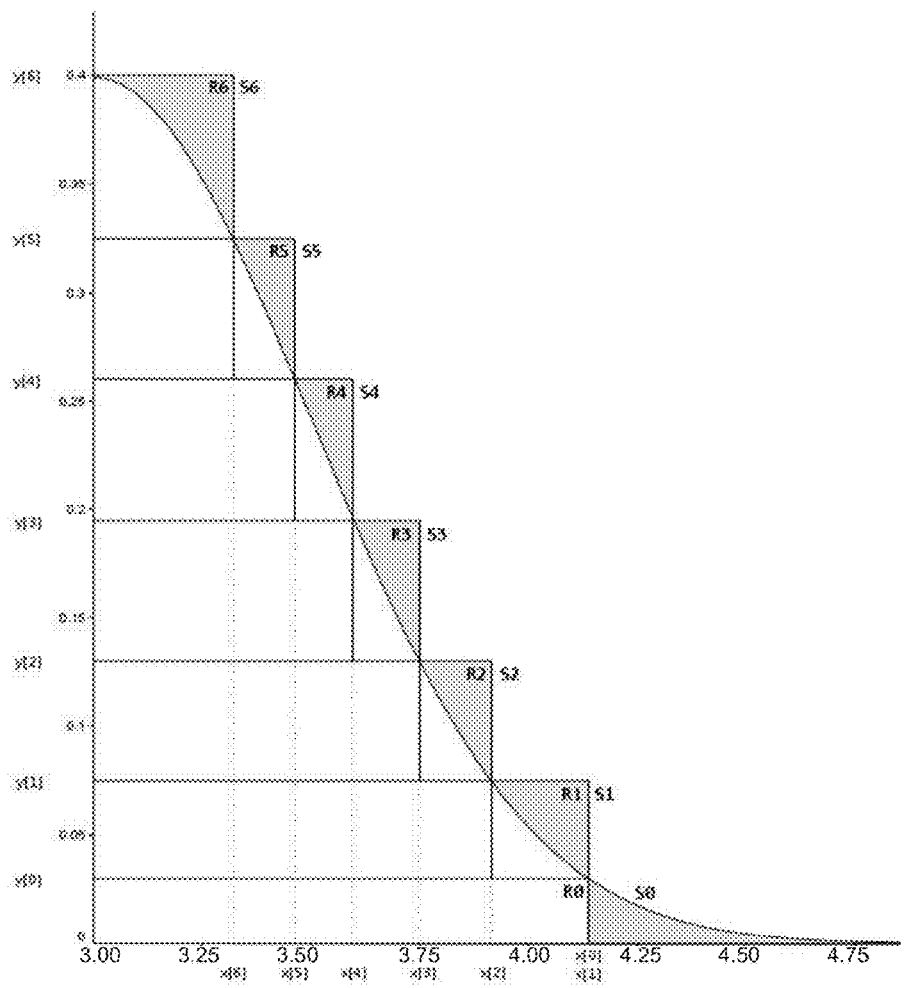
FIG. 5B illustrates the Ziggurat process for random sampling a Gaussian probability distribution of FIG. 5A in accordance with one example embodiment of the present invention.

Referring back to FIG. 4, a random bid price value (or heuristic score) may be generated based on the probability distribution that was built on the current selection of features in operation 412. Any suitable technique for generating a random number from a probability distribution can be used. For instance, a rejection sampling algorithm may be used. One example is the Ziggurat algorithm, which performs a random sampling of a probability distribution, such as a Gaussian distribution, can be used. FIG. 5B illustrates the Ziggurat process for random sampling a Gaussian probability distribution of FIG. 5A in accordance with one example embodiment of the present invention. Another example technique for generating a random number from a probability distribution is the Box-Muller transform.

The Ziggurat algorithm includes defining a series of horizontal rectangles so as to cover the distribution as efficiently as possible, e.g., with minimum area outside of the distribution curve. The technique can first be applied to the right side of the distribution (x>=$3.00), and values on the left side may be obtained by randomly flipping the generated right side values to corresponding left side values.

As shown, each rectangle is initially assigned a number (R0~R6). The right hand edge of each rectangle is placed so that it just covers the distribution, that is, the bottom right corner is on the curve so that some of the area in the top right of the rectangle is outside of the distribution (points with y>f(x)). However, R0 is an exception and is entirely within the distribution since R0 is a special case. The tail of the Gaussian effectively projects into infinity, asymptotically approaching zero. Accordingly, the tail is not covered with a rectangle. Instead, an x cut-off coordinate can be defined. As shown, R0's right hand edge is at the cut-off point with its top right corner on the distribution curve. The tail is then defined as that part of the distribution above this cuff-off and is combined with R0 to form segment S0. Note that the whole of R0 is within the distribution, unlike the other rectangles.

Each rectangle is also referred to as a segment, with the exception of R0 which is a special case as explained above. Essentially S[i] R[i], except for S[0] R[0]+tail. Each segment has identical area A, which also applies to the special segment S0. Thus, the area of R0 is A minus the area represented by the tail. For all other segments, the segment area is the same as the rectangle area. R[i] has right hand edge x[i]. As shown, the region of R[i] to the left of x[i+1] is entirely within the distribution curve, whereas the region greater than x[i+1] is partially above the distribution curve with R0 being an exception. R[i] has top edge of y[i].

Implementations of the algorithm may utilize any suitable number of rectangles. In one example, 128 or 256 rectangles work well. Generating values with a range that is a power of 2 is computationally efficient, and a greater number of rectangles covers the distribution more efficiently (less area outside of the distribution) than a lesser number, although the optimum number depends on a range of factors. FIG. 6B is for demonstration purposes only and is not an accurate rendition of a preferred setup. For instance, the areas of the segments and rectangles are not all equal as preferred.

To generate a random bid value for a particular distribution, a segment, S[i], may be randomly selected to sample from, which segment selection amounts to a low resolution random y coordinate. If the segments have equal area, the segments can be selected from with equal probability. Segment 0 is a special case, which is further described below. For the other segments S1~S6, a value x is randomly selected from within R[i]. If x is less than x[i+1], then x is within the curve and is returned as the random value. For example, if segment S3 is randomly selected and then a bid price of $3.50 is randomly selected from within R3 and used as the random bid price or heuristic score. Otherwise, if x is greater than or equal to x a random y variable is generated from within R[i] so as to produce a high resolution y coordinate, which is a refinement of the low resolution segment selection. If y is less than f(x), the corresponding x value is returned as the random bid value or heuristic score. Otherwise, the process is repeated.

If S0 is initially selected, then a random area value w between 0 and area A may be selected. If w is less than or equal to the area of R0, then a point is being sampled from within R0. In other words, a random area value w has already been generated, and w can be converted to an x value that can be returned by dividing w by the height of R0 (y[0]).

Otherwise, the tail is being sampled. To sample from the tail, a fallback calculation may be used to generate a random number from the tail. In one fallback technique, x is set equal to $-\ln(U_1)/x_1$, where $U_1$ is a first randomly generated number. Next, y is set equal to $-\ln(U_2)$, wherein $U_2$ is a second randomly generated number. If 2y is greater than $x^2$, a random value equal to $x+x_1$ is returned as the heuristic score. Otherwise, the fallback calculation is repeated. Preferably, the cut-off x value that defines the tail is chosen such that the area represented by the tail is relatively small and, therefore, this fallback execution pathway is avoided for a significant proportion of samples generated.

Finally, all of the above describes sampling from the right half of the distribution (x>=mean value). Hence, sampling a symmetrical distribution includes using one more random bit to determine whether to switch to the left side's x value that corresponds to the returned right side value.

Any suitable optimization process may also be used during the sampling process. For instance, all excess terms, except the mean and standard deviation terms, can be removed from the normal distribution to obtain a simpler denormalized curve with the same shape.

Referring back to FIG. 4, after a heuristic score is generated for the first ad, it may then be determined whether there are more ads in operation 414. If there are more ads, a next ad is selected in operation 404 and the process repeats. A probability distribution is constructed for each ad if there is a statistically significant number of impressions for forming a distribution. After each ad's distribution is built, a heuristic score can then be determined for such ad. Of course, all the ads' distributions can be constructed prior to calculating heuristics scores for all the ads.

After all the heuristic scores are calculated, an optional heuristic scoring time register can be updated (e.g., by the system monitor 318) in operation 416. It may then optionally be determined whether the selection of the small subset of features is to be adjusted in operation 418. If the scores are not to be adjusted, the process 400 again waits for a bid request in operation 403. Otherwise, the selection of the small set of features is adjusted in operation 402. By way of examples, additional features may be added to the subset and/or features may be removed from the subset.

In certain cases, the heuristic score for an ad may be adjusted based on other factors, besides bid price (or the value generated from the distribution). For example, the margin that is generated for the DSP company may be considered. That is, the money that goes to the DSP company for each successful bidding as a fee is called margin. In one embodiment, the average historical margin of each advertisement may be calculated. The advertisements can then be ranked based on their average historical margin. For the top k % of advertisements (those that give high margins), their sampled values can be increased by a predefined amount α. For the bottom k % of advertisements (those that give low margins), their sampled values can be decreased by another predefined amount β. Other advertisements (those that give normal margins) can be left unadjusted. Using k=10, α=2, β=0.1 has been found to work well. Of course, the top percentage may differ from the bottom percentage.

In other embodiments, a hierarchical approach may be used in constructing and using probability distributions. In effect, advertiser-related data can be considered as adhering to a somewhat hierarchical structure. For example, every advertisement in the DSP can be considered as belonging to an advertising campaign, which belongs to an advertiser (e.g., Advertisement: 'Incredible Year End Sales Event!' belongs to Campaign: '2011 Year End Sales', which belongs to Advertiser 'Acme Cars').

In some embodiment, the heuristic scoring process takes this hierarchical information into account. For example, besides building probabilities for advertisements, probabilities for their parent campaigns can be built. A probability distribution is only built if enough impressions are available in the historical records. In certain embodiments, probability distributions can be built periodically and do not have to be built each time a bid request is received. When a bid request is received in a hierarchical approach, the following lookup may be performed for each advertisement:

If there is a built probability distribution for this advertisement on this targeting top level domain, use this distribution to generate and return a random value.

Otherwise, if there is a built probability distribution for this advertisement's parent campaign on this top level domain, use this distribution to generate and return a random value.

Otherwise, if there is a built probability distribution for this advertisement on this Ad Exchange, use this distribution to generate and return a random value.

Otherwise, if there is a built probability distribution for this advertisement's parent campaign on this Ad Exchange, use this distribution to generate and return a random value.

Otherwise, if there is a built probability distribution for this channel on this Ad Exchange, use this distribution to generate and return a random value.

Otherwise, generate and return a random value that is not based on a probability distribution.

In some embodiment, it is possible to skip some of the above steps to save CPU and memory usage. In one example, the advertisement hierarchical structure may be aggregated to generate the heuristic scores. For example, the following scoring generation process may be performed for each advertisement when a bid request is received:

If there is a built probability distribution for this advertisement's parent campaign on this top level domain, use this distribution to generate and return a random value.

Otherwise, if there is a built probability distribution for this advertisement's advertiser on this top level domain, use this distribution to generate and return a random value.

Otherwise, if there is a built probability distribution for this advertisement's parent campaign on this Ad Exchange, use this distribution to generate and return a random value.

Otherwise, if there is a built probability distribution for this advertisement's advertiser on this Ad Exchange, use this distribution to generate and return a random value.

Otherwise, if there is a built probability distribution for this channel on this Ad Exchange, use this distribution to generate and return a random value.

Otherwise, generate and return a random value that is not based on a probability distribution.

Similarly, in some embodiment, it is possible to skip some of the above steps to save CPU and memory usage.

In other embodiment, a probability distribution can be constructed for other meta information. Such meta information may include one or more of the following: the category of this advertisement, the category of the URL in the request, or the category of the user in the request. For example, a particular advertisement can be about "Automobile", or "Travel promotion", or "Insurance." Each request contains a URL that the Internet user is requesting. For example, this URL could be about "Political News", or "Fashion", or "Latest Movie." The current user associated with the bid request can be male, or female. In other example, the current user can be child, or adult or senior. In a more specific example, a probability distribution can be built for the impressions delivered to advertisement type "Automobile" and top level domain "yahoo.com." In another example, a probability distribution can be built for the impressions delivered to advertisement type "Automobile" and URL type "Fashion." The possibilities for building probability distributions are many and can depend on which probability distributions are likely to produce higher scores for advertisements that can be placed with more likelihood of resulting in a positive user interaction (e.g., the user performs a conversion or click with respect to the ad).

The hierarchical processes described above can be altered by utilizing these newly built probability distributions. For example, one process can be:

If there is a built probability distribution for this advertisement on this top level domain, use this distribution to generate and return a random value and return a random value.

Otherwise, if there is a built probability distribution for this advertisement's parent campaign on this top level domain, use this distribution to generate and return a random value.

Otherwise, if there is a built probability distribution for this advertisement's advertiser on this top level domain, use this distribution to generate and return a random value.

Otherwise, if there is a built probability distribution for impressions with this advertisement's category on this top level domain, use this distribution to generate and return a random value.

Otherwise, if there is a built probability distribution for impressions with this advertisement's category on websites with this top level domain's category, use this distribution to generate and return a random value.

Otherwise, generate and return a random value that is not based on a probability distribution.

Similarly, in some embodiments, it is possible to skip some of the above steps to save CPU and memory usage. In other embodiments, it is possible to re-order these look-up steps.

After the number of ads is reduced by the heuristic process (308) of FIG. 3, a final scoring process 312 may be implemented on the reduced set of ads. Referring back to FIG. 2, bids may generally be determined for each of the selected top ranked ads based on a substantial number of the bid request's features in operations 214. For an ad having a CPA, the bid b may be computed as:

$$b=p(u;w;a)*CPA$$

where $p(u;w;a)$ is the probability of action given u, w, the ad a, and optionally other related parameters in the bid computation context. This probability may be computed using any suitable techniques, such as a machine learning algorithm. Several example techniques are described in the paper: D. Agarwal, R. Agrawal, and R. Khanna, "Estimating rates of rare events with multiple hierarchies through scalable log-linear models", ACM SIGKDD Conf. on Knowledge Discovery and Data. Mining, 2010, which paper is incorporated herein by reference for providing a technique for determining probability of an actions, such as user conversion or other actions with respect to impressions.

Of course, CPA may be replaced with a CPC or CPM value (converted to a cost per impression). At least some input for determination of this probability p is provided in the bid request itself. In the CPM example, the bid b may be set equal to the advertiser specified CPM minus the fees charged by the DSP.

The final bid and its associated ad specifications (314) can then be sent to the ad exchange system, which sent or forwarded the bid request, in operation 216. For example, the DSP responds back to the bid request sender, e.g., RIB exchange, with its best bid and information on the corresponding ad, specifying how to retrieve the best bid's ad's creative content (e.g., the actual image corresponding to the ad). The RIB exchange then sends its best bid (selected from all DSP best bids) back to the bid request sender (or publisher).

Example Database System Embodiments

The probability distributions can be built by querying historical data from any type of data base system using any suitable data base storage and use protocols. Embodiments of the present invention may be implemented in any suitable network systems, such as described herein. The network may take any suitable form, such as a wide area network or Internet and/or one or more local area networks (LAN's). The network may be in the form of a data, mobile, cellular, plain old telephone network (POTN), or any combination thereof. Referring back to FIG. 1, the network 100 may include any suitable number and type of devices, e.g., routers and switches, for forwarding requests from each client to a particular server application, forwarding application results back to the requesting clients, or forwarding data between various servers or processing devices.

Embodiments of the present invention may also be practiced in a wide variety of network environments including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc., or any combination thereof. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be affected or employed at different locations.

Figure 6:
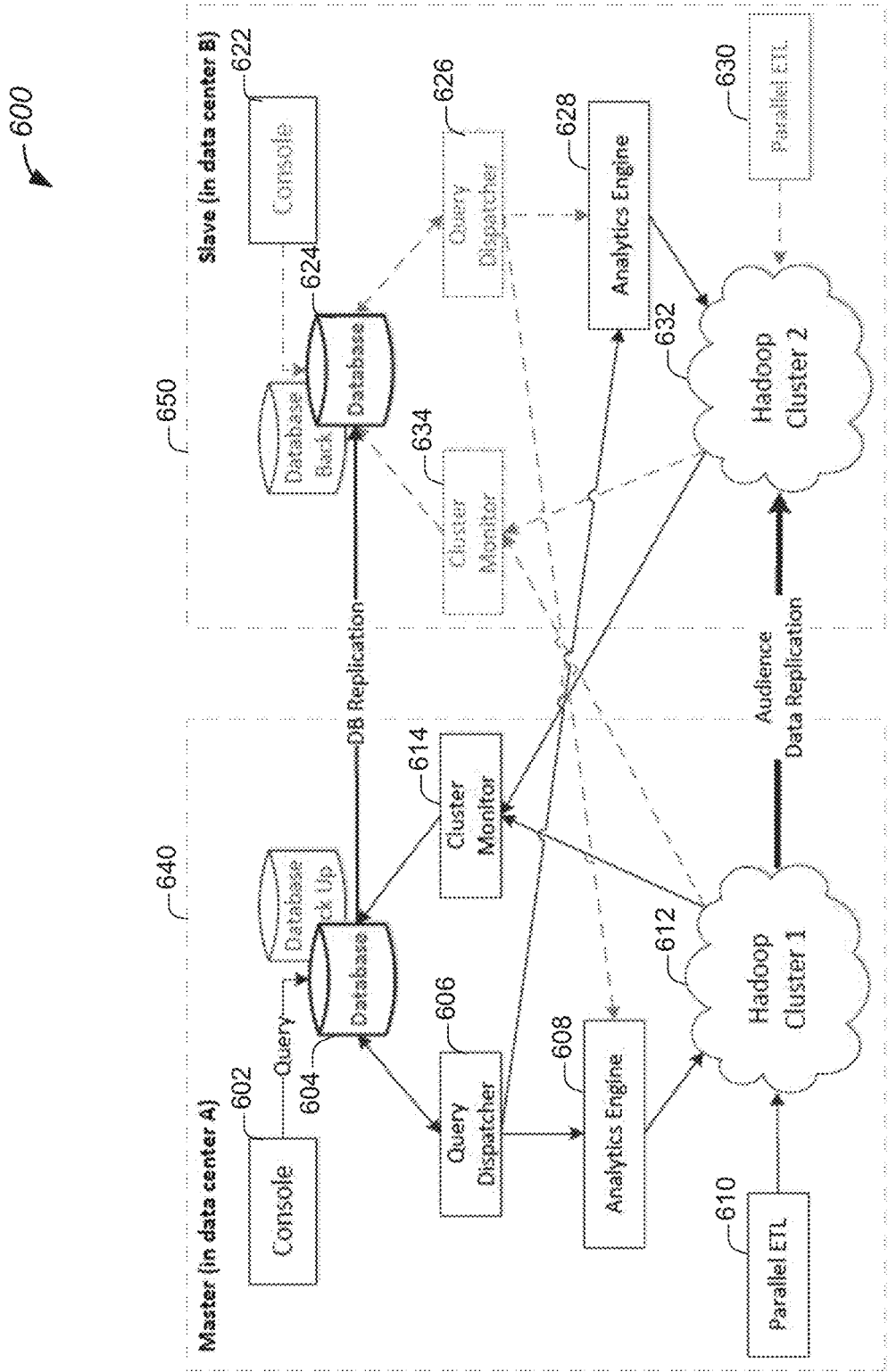
FIG. 6 illustrates a system for redundant data warehousing, configured in accordance with one or more embodiments.

The database systems may include any suitable number and type of components, including specially-configured servers, file system nodes, database storage devices, by way of examples, each having specially-configured interfaces, such as large and efficient input and output buffers, for quickly inputting and outputting large batches of data and performing queries on such data. FIG. 6 illustrates a system for redundant data warehousing, configured in accordance with one or more embodiments. The system shown in FIG. 6 may be used to receive large amounts of data for storage in a data storage system, such as data storage system 110 discussed above, which may be implemented at a first data center site 640. The stored data may be replicated to a second data center site 650. The data center sites may communicate via high-speed network links. The stored data may also be made available for querying.

According to various embodiments, the system shown in FIG. 6 includes redundant components that are each positioned in a respective data center site. For instance, the data centers include consoles 602 and 622, databases 604 and 624, query dispatchers 606 and 626, cluster monitors 614 and 634, analytics engines 608 and 628, data clusters 612 and 632, and parallel ETLs 610 and 630.

According to various embodiments, the data centers may be configured in a master/slave architecture. In the configuration shown in FIG. 6, the first data center site 640 is configured as the master data center while the second data center site 650 is configured as the slave data center. Although the system shown in FIG. 6 includes only two data centers in communication in a single master/slave relationship, other configurations may include various numbers of data centers arranged in various relationships.

In some implementations, the master data center in a master/slave relationship may be responsible for primary data center responsibilities such as ingesting new data, receiving queries to query stored data, dispatching queries to the data clusters, and monitoring the data clusters. The slave data center may be responsible for receiving and storing replicated data transmitted from the master data center. The slave data center may also be configured to execute queries on data stored in the slave data center. In this way, the slave data center may store an up-to-date copy of the data stored in the primary data center while providing load balancing for queries to the data.

In some implementations, one or more components in a slave data center may be placed in a disabled or deactivated state. For instance, in the system shown in FIG. 6, the console 622, the cluster monitor 634, the query dispatcher 626, and the parallel ETL 630 are placed in a disabled or deactivated state. When a component is placed in such a state, the functioning of the component may be suspended. However, the component may be ready to resume functioning upon request, for instance if one or more primary data operations are transferred from one data center to the other data center.

At each of 602 and 622, a console is shown. According to various embodiments, the console may be responsible for receiving requests to query the data stored in the data center. For instance, the console may receive requests to retrieve, alter, summarize, or otherwise analyze records stored in the data center. For example, the console may include a specifically configured interface for receiving and handling queries. These queries may first be processed and analyzed by other components, such as the data processing engine 116 of FIG. 1, before being received and processed with respect to the data center.

At each of database 604 and 624, a database is shown. According to various embodiments, the database may store any information related to the data stored in the data centers and/or the data clusters on which the data is stored. For example, the database may store queries received from the console. As another example, the database may store results of the queries received from the console and executed on the data cluster. The database may also store data cluster status information or metadata describing an operating status of the data cluster. For instance, metadata records may map particular sets of data to particular identifiers for specific data store instances. Any of the data stored within a database may also be accessible by any other component, such as the data processing engine 116 of FIG. 1.

In a specific implementation, each database 604 and 624 may include any suitable number and type of storage instances, which may be centrally located relative to the other components of the system 600, by way of example. The database storage 604 and 624 may also be implemented in a high availability system, such as Zookeeper as one or more metadata tables in MySQL or the like. Some instance operational or status information (e.g., disk usage, map time, reduce time, total execution time, total elapsed time, etc.) may be maintained by Zookeeper ephemeral nodes. The metadata may also be stored as multiple replicas for high availability. For example, the multiple replication solution from XtraDB MySQL cluster (which is available from Percona of Durham, N.C.) works well. A write to a Percona cluster is successful only if all writes to all of the live replicas are successful. Alternatively, a weaker form of eventual consistency can be achieved by using the open source Tungsten replicator, which is available from Google of San Francisco, Calif. The replication mechanism for Tungsten is asynchronous, which may work for writes that do not conflict with the same "cell", so that there will not be conflicts and eventual consistency can be achieved. Alternatively, each cluster instance may maintain its own metadata.

In particular embodiments, the database may be associated with one or more backups. A backup database may be used to continue operations in the event of failure at the primary database. Alternately, or additionally, a backup database may be used to restore the primary database to an earlier state.

In particular embodiments, the database at the master data center may be replicated to the slave data center. The database replication may be performed via any suitable database replication technology. By replicating the database from the master data center to the slave data center, the slave data center may have a stored copy of queries, query results, and data cluster status information in the event of failure of either the master database or the entire master data center site.

At each of 606 and 626, a query dispatcher 606 is shown. According to various embodiments, the query dispatcher may be configured to retrieve queries from the database 604. The query dispatcher may also be configured to update status or metadata information for queries stored in the database. For example, the query dispatcher may update query status information to indicate that a query has been removed from a queue and is now being executed. As another example, the query dispatcher may update query status information to indicate that a query has been completed, as well as update query metrics. As a query executes on one or more instances, such instances may report various resource usage metrics (e.g., along with the query results) to the query dispatcher other component), or the query dispatcher (or other component) may request such metrics from such instances (e.g., to be provided independently of the query results). The query dispatcher may also be configured to provide any suitable type of metadata to a query server and/or client, for example, when a query is completed.

In some implementations, a query dispatcher may be configured to perform load balancing to execute queries on either the master or slave data cluster. For instance, the query dispatcher may retrieve cluster status information from the database 604 and determine whether the master or slave data cluster is better suited to execute a new query. When the query dispatcher selects which data cluster should execute a new query, the query dispatcher may transmit the query to the analytics engine associated with the selected data cluster. For instance, the query dispatcher 606 may transmit the query to the analytics engine 608 at the master data center or the analytics engine 628 at the slave data center after the client indicates that he/she wishes to proceed with the query, for example.

At each of 608 and 628, an analytics engine is shown. According to various embodiments, the analytics engine may be configured to receive queries from a query dispatcher for execution on the data cluster. When a query is received, the analytics engine may execute the query on the data cluster. Executing the query may involve retrieving or altering information stored on the data cluster.

In certain use cases, advertisers may want to know how well their campaign(s) or sub-campaign(s) are performing on certain domains and subdomains. In other use cases, data providers may wish to see how much a particular user segment is being used by different advertisers. Finally, a DSP may execute queries on historical data records to construct probability distributions. In any of these cases, joined data for certain frequently queried join results may be precomputed, instead of joining on the fly, to reduce latency. For instance, joins on different hierarchies of performance data may be precomputed. Examples of hierarchies from which data may be joined may include advertiser (advertiser, campaign and creative), publisher (domain, subdomain) and data provider (data provider and user segment). There could be many combinations of interests to query clients/customers. Additionally, clients may wish to perform queries on different date ranges, including long date range time series as described further below, for different combinations of interests. To allow clients to quickly query their desired data, certain data combinations can be pre-extracted using a MapReduce to precompute all of such aggregated reporting data for different date ranges in batches and different combinations of interests. Regardless of the query type, the execution and elapsed time may be tracked and optionally provided to the client.

In a specific example, multiple queries on a particular multi-relation operation (e.g., join Tables A and B) can be received into the console, which is forwarded to the correct instance(s), from which query results may be provided. If it is determined that the same particular query is likely to be received in the future based on the statistics that are collected for receiving such a particular query, handling of the multi-relation operation may be pushed to the analytics engine, which can then populate the join/product/intersection/difference data sets for the query. The computation output can then be loaded into the system. The query server can determine when the data output is available in the data store system (via being loaded into one or more instances and published). The computation output is then available for subsequent multi-relation queries of the same type. Additionally, common combinations (or joins), such as time series joins as described below, can be pre-computed periodically and stored as new "joined" data that can be readily available to subsequent queries without performance of another join operation.

In another example, a multi-relation query may be converted to a language that is supported by the database system at which the data sets are externally stored outside database system 600. In the illustrated embodiment, the query is an SQL type query, and the data sets are stored in a Hadoop DFS. In this example, the SQL multi-relation query is converted into a MapReduce operation on the DFS data sets.

For example, the data storage system may include two Hadoop® clusters where a first cluster is a primary cluster including one primary namenode, one standby namenode, one secondary namenode, one Jobtracker, and one standby Jobtracker. The second node may be utilized for recovery, backup, and time-costing queries. Furthermore, data storage system may be implemented in one or more data centers utilizing any suitable multiple redundancy and failover techniques. By way of a specific embodiment, all the modules in Hadoop are designed with a fundamental assumption that hardware failures (of individual machines, or racks of machines) are commonplace and, thus, are automatically handled in software by the framework. The term "Hadoop" has come to refer not just to the base modules above, but also to the "ecosystem", or collection of additional software packages that can be installed on top of or alongside Hadoop, such as Apache Pig, Apache Hive, Apache HBase, Apache Spark, and others. In general, a Hadoop-compatible file system provides location awareness: the name of the rack (more precisely, of the network switch) where a worker node is. Hadoop applications can use this information to run work on the node where the data is, and, failing that, on the same rack/switch, reducing backbone traffic. HDFS uses this method when replicating data to try to keep different copies of the data on different racks. The goal is to reduce the impact of a rack power outage or switch failure, so that even if these events occur, the data may still be readable. Various embodiments disclosed herein may also utilize other frameworks, such as .NET or grid computing.

At each of 612 and 632, a data cluster is shown. The data cluster may include one or more storage servers working together to provide performance, capacity, and reliability. In many configurations, the data cluster may include many different storage servers that together provide petabytes, exabytes, or more of storage space. The data clusters shown in FIG. 6 are configured to use the open-source Apache Hadoop framework. However, any storage framework suitable for storing and accessing large amounts of data may be employed. For instance, a data cluster may be implementing using a framework such as Spark, Stratosphere, or Zillabyte.

The data clusters may comprise any suitable number of storage instances that pertain to any suitable type and amount of data or data pointer/reference. Each storage instance may take any suitable physical form and use any suitable database protocol, such as a cluster of relational database management system (RDBMS) instances to store and serve data sets and which support SQL type queries. By way of examples, MySQL, Cheetah-QL (CQL), Oracle, or PostgresSQL-compatible instances, which support ACID (Atomicity, Consistency, Isolation, Durability) compliant and transactional queries, may be implemented. Each instance may include at least two components, by way of example: 1) a local RDBMS instance and 2) an agent running on the same machine. In a specific implementation, the agent is implemented as a Java process, and MySQL is used as the underlying local RDBMS instance.

In a specific implementation, an ephemeral node is maintained for each instance so that liveness can be effectively indicated by the absence or presence of such data for a particular instance. Each instance node or record may contain an identifier and information pertaining to the instance's capabilities for loading data, such as available disk space size or percentage (e.g., Size1), CPU usage (e.g., CPU1), etc. The instance ID may specify instance location or data center location information, as well as an instance name/ID. At least a portion of instance status indicators may be used during a new or updated data sets loading process to determine assignment of data sets to specific instances. This assignment information may be monitored to determine if data has been assigned to new instance(s), which assignment change may trigger the process for determining whether to adjust a model.

Additionally, when an instance's usage goes above a particular threshold (e.g., low disk space) or reaches maximum capacity, an alarm may be triggered. This alarm may cause the loading interface to offload data sets from the overloaded instance by deleting records for such instance. The loading interface may remove data for a particular instance for any suitable reason, such as redistribution or in response to a client deleting a particular data set.

Other metrics may be used to assign data to particular instances. Example metrics may include one or more of the following: available disk space size or percentage, CPU usage, a location of the instances (e.g., location of the server or data center), schema of the instances, username of the instances, etc.

In a specific implementation, file access for the HDFS framework can be achieved through the native Java API, the Thrift API to generate a client in the language of the users' choosing (C++, Java, Python, PHP, Ruby, Erlang, Perl, Haskell, C#, Cocoa, Smalltalk, and OCaml), the command-line interface, browsed through the HDFS-UI web app over HTTP, or via 3rd-party network client libraries.

Data may be loaded into the RDBMS instance, for example, on the same machine. After each specified instance loads its new or updated data, the instance (e.g., via the agent) may then publish the loaded data with respect to the metadata store as a resource.

According to various embodiments, the data cluster may store any of various types of information. For example, in one configuration the data cluster may store advertising analytics information that includes user data for advertising audience members. Such data may include user demographics information and/or user responses to digital advertisements. However, in other configurations the data cluster may store any type of high-volume data suitable for storage in a data storage cluster.

At each of 610 and 630, a parallel ETL is shown. In some implementations, the data may be ingested in to the data cluster via the parallel ETL. The parallel ETL may be responsible for extracting data from homogenous or heterogeneous data sources, transforming the data for storing it in the proper format in the data cluster, and loading it into the data cluster.

In particular embodiments, the parallel ETL may be configured to perform one or more different storage operations simultaneously. For instance, while data is being pulled in by one process, another transformation process may process the received data. Then, the data may be loaded into the data cluster as soon as transformed data is available for loading, without waiting for either or both of the earlier processes to be completed.

According to various embodiments, data may be replicated from the master data center cluster to the slave data center cluster. For example, data may be transferred from the master data center cluster to the slave data center cluster periodically, such as once every hour. As another example, data may be transferred when a calculated difference in the data stored on the two data clusters reaches a designated threshold. The data may be transfer via any suitable technique for replicating data, such as in one or more compressed data storage containers.

At each of 614 and 634, a cluster monitor is shown. According to various embodiments, the cluster monitor may be configured to receive information from one or both of the master data cluster and the slave data cluster. The information may include metadata that characterizes the contents and operations of the data cluster. For example, the cluster monitor may be configured to receive query results from the data cluster and store the query results in the database. As another example, the cluster monitor may be configured to receive status information from the data cluster that indicates the current processing load of the data cluster, the operational status of the data cluster, or other such information as described further herein. For instance, the cluster may transmit to the cluster monitor an indication as to whether the data cluster is fully operational or whether one or more portions of the data cluster have failed. As another example, the cluster monitor may be configured to receive data storage information such as space usage, a number of files stored, a number of queries being executed, CPU usage, etc.

According to various embodiments, the system shown in FIG. 6 may be configured for disaster recovery and high availability. For example, the system may be capable of gracefully responding to a failure of either one or more components at the master data center and/or the entire master data center.

According to various embodiments, the components shown in FIG. 6 may be implemented in software, hardware, or a combination thereof as further described herein. In some instances, a component may be implemented in specialized hardware configured to perform particular data processing tasks. For example, any or all of the console 602, the database 604, the query dispatcher 606, the analytics engine 608, the cluster monitor 614, and the parallel ETL 610 as well as their counterparts in the slave data center may be implemented as customized hardware components configured to perform specific data processing tasks or any type of hardware, for example, as described herein.

In some implementations, any of the components shown in FIG. 6 may be backed up by duplicate components ready to take over in the event of failure of the primary component. According to various embodiments, a data center may experience any of various types of failures, all of which the techniques and mechanisms described herein may be used to track various changes in the resource usage. These failures may include, but are not limited to: network failures, power failures, cooling failures, data cluster failures, hardware failures, software failures, or catastrophic failures of an entire data center.

In some implementations, the components within a data center may communicate via high speed network links such as 200 gigabit, 1 terabit Ethernet, or even faster connections. Components across data centers may communicate via customized high speed network links or via public networks such as the Internet.

The disclosed techniques of the present invention may be implemented in any suitable combination of software and/or hardware system, such as a web-based server or desktop computer system. An apparatus for implementing one or more portions of this invention may be specially constructed for the required purposes, or it may be a computer selectively activated or reconfigured by a computer program and/or data structure stored in the computer. The processes presented herein are not inherently related to any particular computer or other apparatus. In particular, various general-purpose machines may be specifically configured with programs written in accordance with the teachings herein, or it may be more convenient to construct a hardware specialized apparatus to perform the disclosed method steps.

Figure 7:
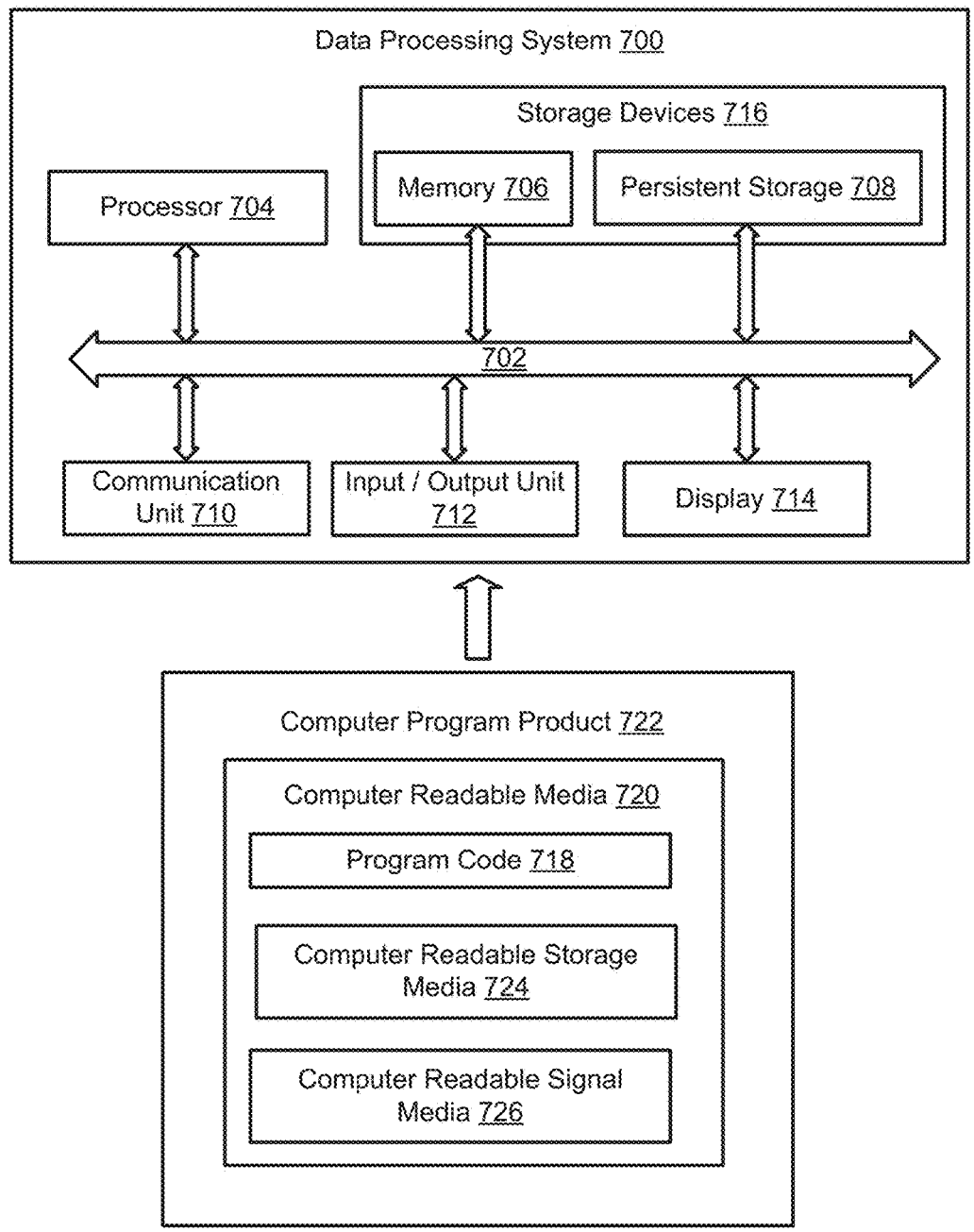
FIG. 7 illustrates a typical computer system that, when appropriately configured or designed, can implement as least portions of the advertisement selection process embodiments described herein.

FIG. 7 illustrates a data processing system configured in accordance with some embodiments. Data processing system 700, also referred to herein as a computer system, may be used to implement one or more computers or processing devices used in a controller, server, or other components of systems described above. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, as may be included in a multi-processor core. In various embodiments, processor unit 704 is specifically configured to process large amounts of data that may be involved when processing data associated with one or more advertisement campaigns or other types of data sets, as discussed above. Thus, processor unit 704 may be an application specific processor that may be implemented as one or more application specific integrated circuits (ASICs) within a processing system. Such specific configuration of processor unit 704 may provide increased efficiency when processing the large amounts of data involved with the previously described systems, devices, and methods. Moreover, in some embodiments, processor unit 704 may include one or more reprogrammable logic devices, such as field-programmable gate arrays (FPGAs), that may be programmed or specifically configured to optimally perform the previously described processing operations in the context of large and complex data sets sometimes referred to as "big data."

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718, rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of selecting on-line advertisements in a real-time bidding exchange, the method comprising:
receiving from a publisher server at an on-line advertisement system, a bid request associated with a first data set;
the advertisement system filtering a plurality of advertisements based on each advertisement's campaign constraints as applied to the first data set of the bid request;
the advertisement system determining a heuristic score for each filtered advertisement based on a small subset of features from the first data set or randomly generated, wherein each filtered advertisement's associated data sets are distributed and processed among a plurality of cluster nodes via data packets over a network, each of the plurality of cluster nodes storing a respective portion of the filtered advertisements and associated data sets;
only for each of a top fraction of the filtered advertisements that have the highest heuristic scores, determining a bid value based on a substantial number of the features from the first data set, wherein each heuristic score is determined by generating a random number using a probability distribution of bid price, click-through rate, action rate, or return-on-investment values and the probability distribution is constructed from historical records queried and aggregated by an aggregator node from the plurality of cluster nodes and pertaining to a plurality of impressions for real-time bidding;
determining and sending a final one of the bid values and its associated advertisement to a sender of the bid request for presenting in an on-line advertisement space as an impression;
receiving a plurality of bid requests;
for each bid request, repeating the operations of filtering, determining heuristic score, determining a bid value, and determining and sending a final bid value; and
monitoring the time duration for determining the heuristic scores for each bid request and adjusting a number of the small subset of features based on the monitored time duration.

2. The method of claim 1, further comprising decreasing the determined heuristic scores for a predefined number or percentage of the advertisements and increasing the determined heuristic scores for a predefined number or percentage of the advertisements.

3. The method of claim 1, further comprising:
determining whether there are more than a predefined number of advertisements, and wherein the heuristic scores for the filtered advertisements are only determined if there are more than the predefined number.

4. The method of claim 1, wherein each heuristic score is determined by generating a random number.

5. The method of claim 1, wherein each heuristic score is determined by a stochastic process based on the small subset of features.

6. The method of claim 1, wherein each heuristic score is determined by generating a random number by rejection sampling of the probability distribution.

7. The method of claim 1, wherein the small subset of features are selected as best discriminating between bid price, click-through rate, action rate, or return-on-investment values that are obtained for such small subset of features from the historical records.

8. The method of claim 7, wherein the small subset of features includes an inventory source of the bid request, a top level domain of the bid request, and a channel of the bid request.

9. The method of claim 8, further comprising:
constructing and using a probability distribution of bid price, click-through rate, action rate, or return-on-investment values for each filtered advertisement on the top level domain of the bid request if there are enough impression data sets to form a statistically significant probability distribution;
otherwise constructing and using a probability distribution of bid price, click-through rate, action rate, or return-on-investment values for each filtered advertisement on the inventory source of the bid request if there are enough impression data sets to form a statistically significant probability distribution; or
otherwise constructing and using a probability distribution of bid price, click-through rate, action rate, or return-on-investment values on the channel of the bid request if there are enough impression data sets to form a statistically significant probability distribution.

10. The method of claim 8, wherein each heuristic score for each filtered advertisement is determined by:
if there is a probability distribution for this filtered advertisement that can be constructed on the top level domain of the bid request, using this distribution to generate and return a random value as the heuristic score for this filtered advertisement;
otherwise, if there is a probability distribution for this advertisement's parent campaign that can be constructed on this top level domain, using this distribution to generate and return a random value as the heuristic score for this filtered advertisement;

otherwise, if there is a probability distribution for this advertisement that can be constructed on the inventory source, using this distribution to generate and return a random value;

otherwise, if there is a built probability distribution for this advertisement's parent campaign that can be constructed on the inventory source, using this distribution to generate and return a random value as the heuristic score for this filtered advertisement;

otherwise, if there is a probability distribution for this channel that can be constructed on the inventory source, using this distribution to generate and return a random value as the heuristic score for this filtered advertisement; or otherwise, generating and returning a random value as the heuristic score for this filtered advertisement that is not based on a probability distribution.

11. The method of claim 8, wherein each heuristic score for each filtered advertisement is determined by:

if there is a probability distribution for this advertisement's parent campaign that can be constructed on the top level domain, using this distribution to generate and return a random value as the heuristic score for this filtered advertisement;

otherwise, if there is a probability distribution for this advertisement's advertiser that can be constructed on the top level domain, using this distribution to generate and return a random value as the heuristic score for this filtered advertisement;

otherwise, if there is a probability distribution for this advertisement's parent campaign that can be constructed on the inventory source, using this distribution to generate and return a random value;

otherwise, if there is a built probability distribution for this advertisement's advertiser that can be constructed on the inventory source, using this distribution to generate and return a random value as the heuristic score for this filtered advertisement;

otherwise, if there is a probability distribution for this channel that can be constructed on the inventory source, using this distribution to generate and return a random value as the heuristic score for this filtered advertisement; or otherwise, generating and returning a random value as the heuristic score for this filtered advertisement that is not based on a probability distribution.

12. The method of claim 8, wherein each heuristic score for each filtered advertisement is determined by:

if there is a probability distribution for this advertisement that can be constructed on the top level domain of the bid request, using this distribution to generate and return a random value as the heuristic score for this filtered advertisement;

otherwise, if there is a probability distribution for this advertisement's advertisement campaign that can be constructed on the top level domain, using this distribution to generate and return a random value as the heuristic score for this filtered advertisement;

otherwise, if there is a probability distribution for this advertisement's advertiser that can be constructed on the top level domain, using this distribution to generate and return a random value;

otherwise, if there is a built probability distribution for impressions with this advertisement's category that can be constructed on the top level domain, using this distribution to generate and return a random value as the heuristic score for this filtered advertisement;

otherwise, if there is a probability distribution for impressions with this advertisement's category that can be constructed on websites with the top level domain's category, using this distribution to generate and return a random value as the heuristic score for this filtered advertisement; or otherwise, generating and returning a random value as the heuristic score for this filtered advertisement that is not based on a probability distribution.

13. A system for selecting on-line advertisements in a real-time bidding exchange, the system comprising:

an advertiser server that is configured to receive a plurality of bid requests;

a database system for storing a plurality of historical records pertaining to a plurality of impressions for real-time bidding;

a plurality of clsuter nodes;

an aggregator node; and a bid processing engine configured for performing the following operations:

filtering a plurality of advertisements based on each advertisement's campaign constraints as applied to the first data set associated with a bid request received by the advertiser server;

determining a heuristic score for each filtered advertisement based on analysis of a small subset of features from the first data set with respect to the historical records or randomly generated, wherein each filtered advertisement's associated data sets are distributed and processed among the plurality of cluster nodes via data packets over a network, each of the plurality of cluster nodes storing a respective portion of the filtered advertisements and associated data sets;

only for each of a top fraction of the filtered advertisements that have the highest heuristic scores, determining a bid value based on a substantial number of the features from the first data set, wherein each heuristic score is determined by generating a random number using a probability distribution of bid price, click-through rate, action rate, or return-on-investment values and the probability distribution is constructed from historical records queried and aggregated by the aggregator node from the plurality of cluster nodes and pertaining to a plurality of impressions for real-time bidding;

determining a final one of the bid values; and for each bid request, repeating the operations of filtering, determining heuristic score, determining a bid value, and determining and sending a final bid value for each of a plurality of bid requests; and wherein the advertiser server is further configured to send the final bid and its associated advertisement to a sender of the bid request for presenting in an on-line advertisement space as an impression; and a system monitor with a heuristic scoring timer register for storing a time duration metric for determining the heuristic scores for each bid request, wherein the system monitor is configured to monitor the heuristic scoring timer register and adjust a number of the small subset of features based on the time duration metric stored therein.

14. The system of claim 13, wherein each heuristic score is determined by generating a random number using a probability distribution of bid price, click-through rate, action rate, or return-on-investment values and that the probability distribution is constructed from historical records queried from the database system and pertaining to a plurality of impressions for real-time bidding.

15. The system of claim 14, wherein each heuristic score is determined by generating a random number by rejection sampling of the probability distribution.

16. The system of claim 14, wherein the small subset of features are selected as best discriminating between bid price, click-through rate, action rate, or return-on-investment values that are obtained for such small subset of features from the historical records.

17. The system of claim 16, wherein the small subset of features includes an inventory source of the bid request, a top level domain of the bid request, and a channel of the bid request.

18. The system of claim 17, wherein the bid processing engine is further configured for:

constructing and using a probability distribution of bid price, click-through rate, action rate, or return-on-investment values for each filtered advertisement on the top level domain of the bid request if there are enough impression data sets to form a statistically significant probability distribution;

otherwise constructing and using a probability distribution of bid price, click-through rate, action rate, or return-on-investment values for each filtered advertisement on the inventory source of the bid request if there are enough impression data sets to form a statistically significant probability distribution; or otherwise constructing and using a probability distribution of bid price, click-through rate, action rate, or return-on-investment values on the channel of the bid request if there are enough impression data sets to form a statistically significant probability distribution.

* * * * *